US012015232B1

(12) United States Patent
Lin

(10) Patent No.: US 12,015,232 B1
(45) Date of Patent: Jun. 18, 2024

(54) CRIMPING PLIERS

(71) Applicant: Mao Lin, Wenzhou (CN)

(72) Inventor: Mao Lin, Wenzhou (CN)

(*) Notice: Subject to any disclaimer, the term of this patent is extended or adjusted under 35 U.S.C. 154(b) by 0 days.

(21) Appl. No.: 18/526,928

(22) Filed: Dec. 1, 2023

(30) Foreign Application Priority Data

Oct. 9, 2023 (CN) ........................ 202322695280.X

(51) Int. Cl.
*H01R 43/042* (2006.01)
*B25B 7/22* (2006.01)

(52) U.S. Cl.
CPC ............. *H01R 43/042* (2013.01); *B25B 7/22* (2013.01)

(58) Field of Classification Search
CPC ... H01R 43/042; H01R 43/0421; B26B 11/00; B27B 7/22; B25B 17/146
USPC ............................................ 7/107; 72/409.12
See application file for complete search history.

(56) References Cited

U.S. PATENT DOCUMENTS 714,109 A * 11/1902 Henderson et al. . H02G 1/1214 30/91.2
3,514,990 A * 6/1970 Lahrheim ............ H01R 43/042 72/416
5,012,666 A * 5/1991 Chen .................... H01R 43/042 81/382
5,063,770 A * 11/1991 Chen .................... H02G 1/1214 81/421
5,579,667 A * 12/1996 Kim ........................ B25B 13/10 81/185.1
6,477,925 B2 * 11/2002 Lin ........................... B25B 7/04 81/185.1
9,257,806 B2 * 2/2016 Lai ............................ B25B 7/04
9,403,264 B2 * 8/2016 Hofmann ........... H01R 43/0424

* cited by examiner

*Primary Examiner* — Hadi Shakeri
(74) *Attorney, Agent, or Firm* — Daniel M. Cohn; Howard M. Cohn

(57) ABSTRACT

The present disclosure provides crimping pliers, comprising: a first plier member, a second plier member, a limiting component, a first crimping module, a second crimping module; the first plier member comprises a first clamping part and a first handle connected with the first clamping part; the second plier member comprises a second clamping part, a connecting member and a second handle; the limiting component is provided between the first handle and the second handle; the first crimping module is detachably disposed in the first clamping gap at the jaw of the first clamping part and is adsorbed by the first magnetic member. By detachably disposing the crimping module at the pliers and adsorbing and fixing it through magnetic components, the structure is more streamlined and the crimping module can be disassembled and replaced more quickly.

8 Claims, 5 Drawing Sheets

CRIMPING PLIERS

TECHNICAL FIELD

The present disclosure relates to a technical field of crimping equipment, and in particular to crimping pliers.

BACKGROUND

There are so many tools used in traditional industrial wiring, such as screwdrivers, needle-nose pliers, wire strippers or pipe cutters, etc. Each tool has its own specific use method and purpose. The most important part is the wiring part used to connect electrical appliances. The fastest way for early construction masters to connect the wires was to peel off a small section of the outer sheath of the wires to expose the internal metal wires, and then wrap them directly around the contacts of electrical appliances. This connection method is not allowed under current industrial wiring regulations. The reason is that the connection through metal wires is not stable enough at all and is easily broken and deformed. As a result, the circuit is disconnected and leads to a major disaster. In order to solve this problem, crimping pliers are currently used to achieve a more stable connection between wires.

There are many types of crimping pliers in the prior art, and various special wiring and crimping tools need to be prepared according to the type and model of wiring. For construction sites that require a variety of wiring requirements, a variety of crimping pliers are needed at the same time. Traditional crimping pliers can only meet the wiring requirements of one or two sizes of cables of a single line type. Corresponding wiring and crimping tools are still needed for different types of line types. The disadvantage is that the number of tools is large, and the tool bag is large and heavy. It is inconvenient to carry and the cost of purchasing tools is high.

SUMMARY

The present disclosure provides crimping pliers, and solves the problem of the existing crimping pliers have a single wire shape and are inconvenient to process.

The working process of the crimping pliers of the present application is as follows: crimping pliers, comprising: a first plier member, a second plier member, a limiting component, a first crimping module, a second crimping module; the first plier member comprises a first clamping part and a first handle connected with the first clamping part; the first clamping part comprises two first clamping pieces spaced apart to form a first clamping gap; a first magnetic component is disposed in the first clamping gap at the jaw of the first clamping part; the second plier member comprises a second clamping part, a connecting member and a second handle; one side of the connecting member is fixedly arranged on the second clamping part; one end of the connecting member is pivotally connected in the first clamping gap on one side of the first clamping part, and the other end is pivotally connected to one end of the second handle; the second clamping part comprises two second clamping pieces spaced apart to form a second clamping gap; a second magnetic component is disposed in the second clamping gap at the jaw of the second clamping part; the limiting component is provided between the first handle and the second handle; the first crimping module is detachably disposed in the first clamping gap at the jaw of the first clamping part and is adsorbed by the first magnetic member; the second crimping module is detachably disposed in the second clamping gap at the jaw of the second clamping part and is adsorbed by the second magnetic member.

In one embodiment, the second handle comprises a first handle piece and a second handle piece spaced apart from each other; one end of the first handle piece is provided with a first engaging hole; the same end of the second handle piece is provided with a second engaging hole facing the first engaging hole; one end of the connecting member is inserted into the gap between the first handle piece and the second handle piece and is provided with a through hole directly opposite the first engaging hole; an adjustment pin is provided in the first engaging hole, the second engaging hole and the through hole.

In one embodiment, the adjustment pin comprises a knob portion arranged in sequence, a first engaging portion matching the first engaging hole, an eccentric shaft matching the through hole, a second engaging portion matching the second engaging hole, a threaded portion, and a nut screwed to the threaded portion.

In one embodiment, the second engaging portion is covered with a first elastic member, and the first elastic member is located between the nut and the second handle piece.

In one embodiment, a second elastic member is provided between the connecting member near the second handle and the first clamping part.

In one embodiment, the limiting component comprises a limiting rod and a limiting part, both ends of the limiting rod are pivotally connected to the first handle and the second handle respectively; one end of the limiting rod pivotally connected to the second handle is provided with a tooth groove; the limiting part includes an internal hollow shaft body and a third elastic member. The shaft body is pivotally assembled on the second handle and close to the tooth groove; the outer wall of the shaft body is provided with a cog part, a dialing part and a hooking part that match the tooth groove; one end of the third elastic member is connected to the second handle, and the other end of the third elastic member is connected to the hooking part.

In one embodiment, a first guide body is provided at the jaw of the first clamping part, and a second guide body is provided at the jaw of the second clamping part; the first guide body and the second guide body are both provided with limiting slide rails, and the first magnetic member and the second magnetic member are provided at the ends of the slide rails; the first crimping module and the second crimping module are both provided with slide grooves that match the limiting slide rails.

In one embodiment, the connection between the first handle and the first clamping part is provided with a installation housing and a fixed installation groove, one of the two first clamping piece is provided with a bayonet and the bayonet is located at the bottom of the installation housing, and the other first clamping piece is provided with a card slot and the card slot is located at the top of the installation housing; an elastic button is movably provided in the installation housing; a first peeling knife is provided at the lower end of the elastic button and the first peeling knife is inserted into the bayonet; a second peeling knife is disposed in the fixed installation groove and is inserted into the card slot, and the cutting edges of the first peeling knife and the second peeling knife are in contact with each other.

In one embodiment, the first peeling knife and second peeling knife are correspondingly provided with multiple tangent grooves of different diameters along the length direction.

In one embodiment, one side of the second crimping module facing the first crimping module is recessed to define clamping grooves of different diameters; one side of the first crimping module facing the second crimping module is equipped with protrusions of different sizes, and the protrusions are one-to-one corresponding to the clamping grooves.

The present disclosure has beneficial effects as follows.

The present invention provides a crimping plier, in which a crimping module is detachably disposed at the jaws of the first clamping part and the second clamping part of the crimping plier, so that the crimping module can be disassembled and replaced. In this way, crimping modules of different line types can be matched according to needs. Moreover, the crimping module is adsorbed and fixed by magnetic members. Compared with the method of fixing by mechanical structure, the structure is more streamlined, and the disassembly and installation process is more convenient and faster.

BRIEF DESCRIPTION OF DRAWINGS

In order to more clearly illustrate technical solutions in embodiments of the present disclosure, drawings required in description or prior art are briefly introduced below, and obviously, the drawings in the following description are merely some embodiments of the present disclosure. For a person having ordinary skill in art, other drawings may be obtained according to the drawings without creative efforts.

Figure 1:
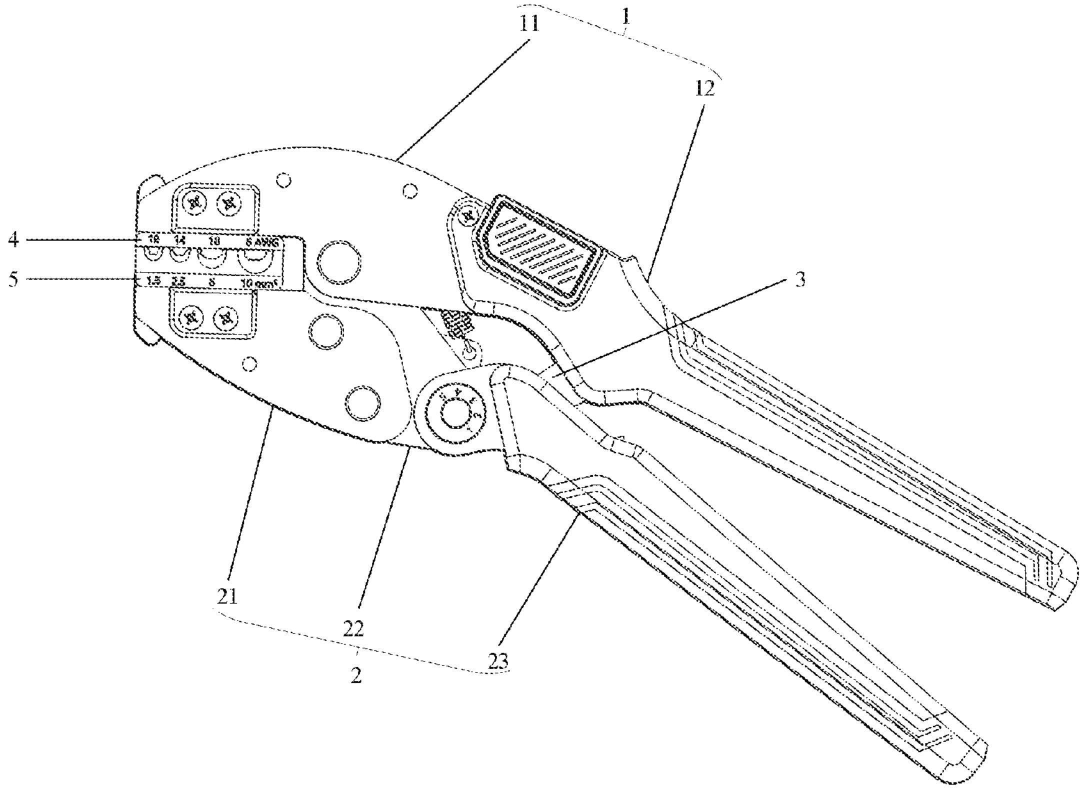
FIG. 1 is a schematic diagram of the overall structure of the crimping pliers.

Reference number in the drawings:

| | | | |
|---|---|---|---|
| first plier member | 1 | second plier member | 2 |
| limiting component | 3 | first crimping module | 4 |
| second crimping module | 5 | rubber sleeves | 6 |
| second elastic member | 7 | limiting slide rails | 8 |
| slide grooves | 9 | first clamping part | 11 |
| first handle | 12 | first magnetic component | 13 |
| installation housing | 14 | fixed installation groove | 15 |
| first clamping piece | 111 | first clamping gap | 112 |
| first guide body | 113 | bayonet | 114 |
| card slot | 115 | elastic button | 116 |
| first peeling knife | 117 | second peeling knife | 118 |
| tangent grooves | 119 | second clamping part | 21 |
| connecting member | 22 | second handle | 23 |
| second magnetic member | 24 | adjustment pin | 25 |
| second clamping pieces | 211 | second clamping gap | 212 |
| second guide body | 213 | second clamping pieces | 221 |

-continued

Reference number in the drawings:

| | | | |
|---|---|---|---|
| first handle piec | 231 | second handle piece | 232 |
| first engaging hole | 233 | second engaging hole | 234 |
| knob portion | 251 | first engaging portion | 252 |
| eccentric shaft | 253 | second engaging portion | 254 |
| threaded portion | 255 | nut | 256 |
| first elastic member | 257 | limiting rod | 31 |
| limiting part | 32 | tooth groove | 311 |
| shaft body | 321 | third elastic member | 322 |
| cog part | 323 | dialing part | 324 |
| protrusions | 41 | hooking part | 325 |
| clamping grooves | 51 | | |

DETAILED DESCRIPTION

The following describes in detail the embodiments of the present disclosure, examples of which are illustrated in the accompanying drawings, wherein the same or similar reference numerals refer to the same or similar elements or elements having the same or similar functions throughout. The embodiments described below with reference to the accompanying drawings are exemplary, and are not intended to limit the present disclosure.

In order to make the purpose, technical solutions, and advantages of the present disclosure clear, the following further describes the present disclosure in detail with reference to accompanying drawings and embodiments.

Figure 2:
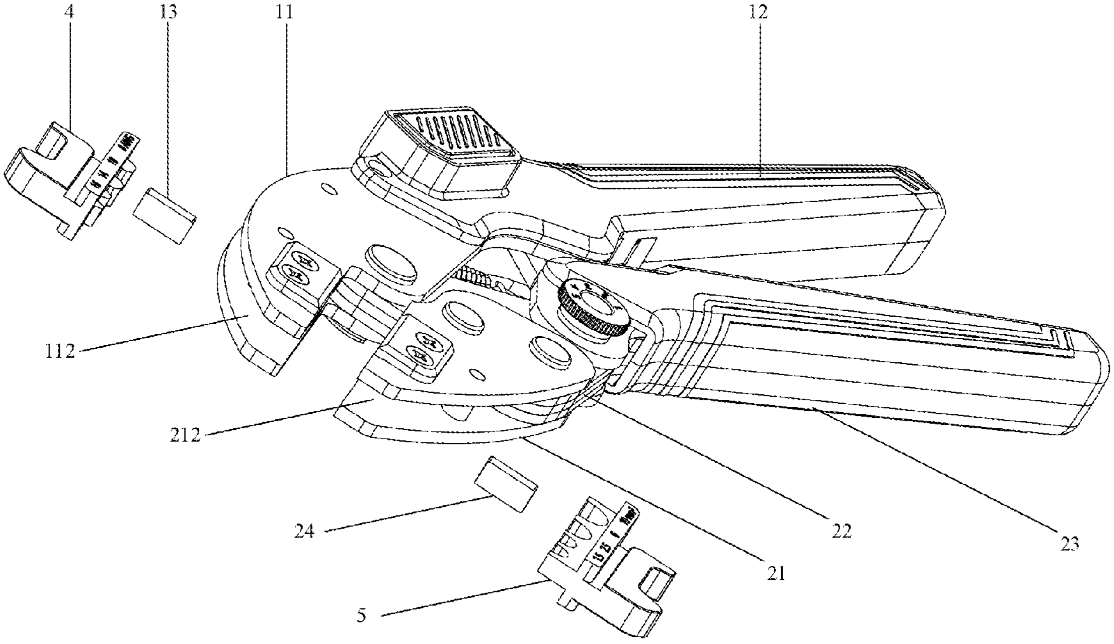
FIG. 2 is a schematic diagram of the partially disassembled structure of the crimping pliers.
Figure 3:
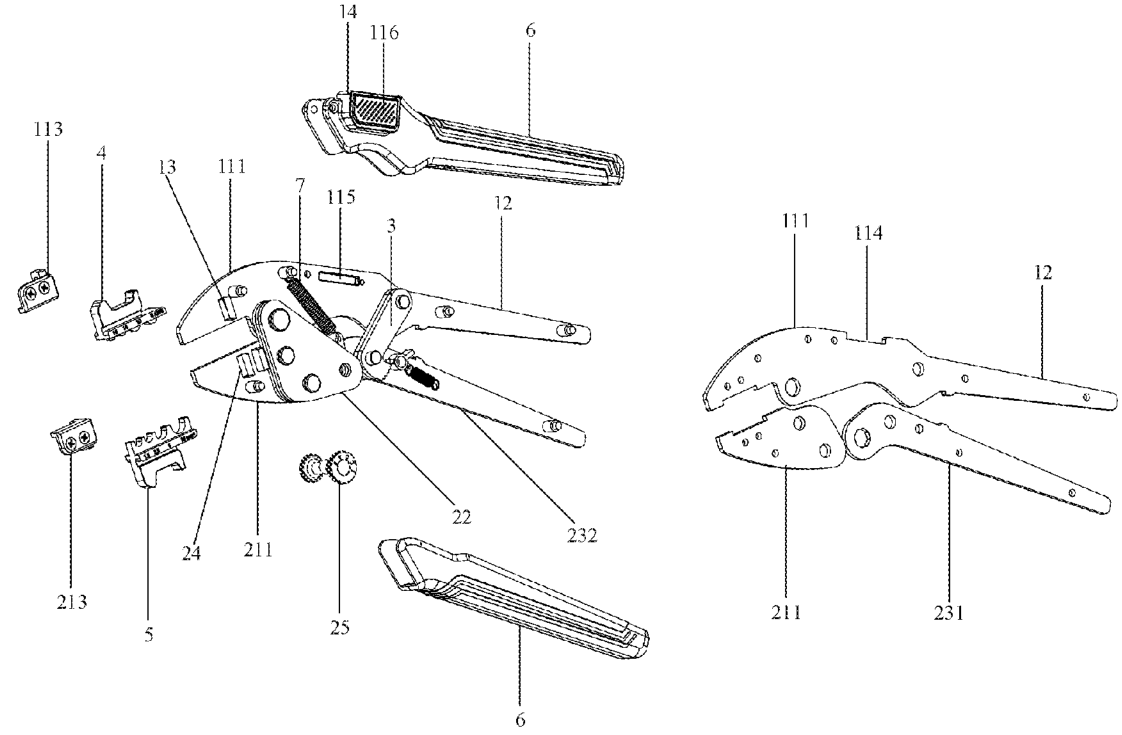
FIG. 3 is a schematic diagram of the exploded structure of the crimping pliers.

FIG. 1 to FIG. 3 show a schematic structural diagram of an embodiment of the crimping pliers. Referring to FIG. 1 to FIG. 3, the present disclosure provides a crimping pliers, comprising: a first plier member 1, a second plier member 2, a limiting component 3, a first crimping module 4, a second crimping module 5. The first plier member 1 comprises a first clamping part 11 and a first handle 12 connected with the first clamping part 11; the first clamping part 11 comprises two first clamping pieces 111 spaced apart to form a first clamping gap 112; a first magnetic component 13 is disposed in the first clamping gap 112 at the jaw of the first clamping part 11; the second plier member 2 comprises a second clamping part 21, a connecting member 22 and a second handle 23; one side of the connecting member 22 is fixedly arranged on the second clamping part 21; one end of the connecting member 22 is pivotally connected in the first clamping gap 112 on one side of the first clamping part 11, and the other end is pivotally connected to one end of the second handle 23; the second clamping part 21 comprises two second clamping pieces 211 spaced apart to form a second clamping gap 212; a second magnetic component 24 is disposed in the second clamping gap 212 at the jaw of the second clamping part 21. The limiting component 3 is provided between the first handle 12 and the second handle 23 to provide support when a gripping force is applied to the first handle 12 and the second handle 23. The first crimping module 4 is detachably disposed in the first clamping gap 112 at the jaw of the first clamping part 11 and is adsorbed by the first magnetic member 13. The second crimping module 5 is detachably disposed in the second clamping gap 212 at the jaw of the second clamping part 21 and is adsorbed by the second magnetic member 24. It should be noted that the first crimping module 4 and the second crimping module 5 are made of materials that can be attracted by the magnetic force generated by the first magnetic component 13 and the second magnetic component 24.

Preferably, in this embodiment, the first clamping part 11 and the first handle 12 are integrally formed, thereby increasing the strength of the first plier member 1 and extending the service life of the crimping pliers.

Preferably, the connecting member 22 is configured in a triangular shape, with one corner fixed to the second clamping part 21 through two through-axes. And insert the other corner into the first clamping gap 112 on one side of the first clamping part 11 and pivot it, and pivot the last corner with one end of the second handle 23.

Specifically, when using the crimping pliers, hold the first handle 12 and the second handle 23 tightly, under the support of the limiting component 3, the rear end of the second handle 23 moves in a direction closer to the first handle 12, and the front end of the second handle 23 moves in a direction away from the first handle 12, driving the end of the connecting member 22 connected to the second handle 23 to move. The other end of the connecting member 22 is pivotally connected to the first clamping part 11, so that the side of the connecting member 22 fixedly connected to the second clamping part 21 moves, driving the second clamping part 21 to move toward the first clamping part 11, thereby compressing the wires between the first crimping module 4 and the second crimping module 5.

Preferably, in this embodiment, the first handle 12 and the second handle 23 are both covered with rubber sleeves 6, and the rubber sleeves 6 are provided with anti-slip patterns.

In this embodiment, the crimping module is detachably disposed at the jaws of the first clamping part 11 and the second clamping part 21 of the crimping tool, so that the crimping module can be disassembled and replaced. In this way, crimping modules of different line types can be matched according to needs.

Figure 4:
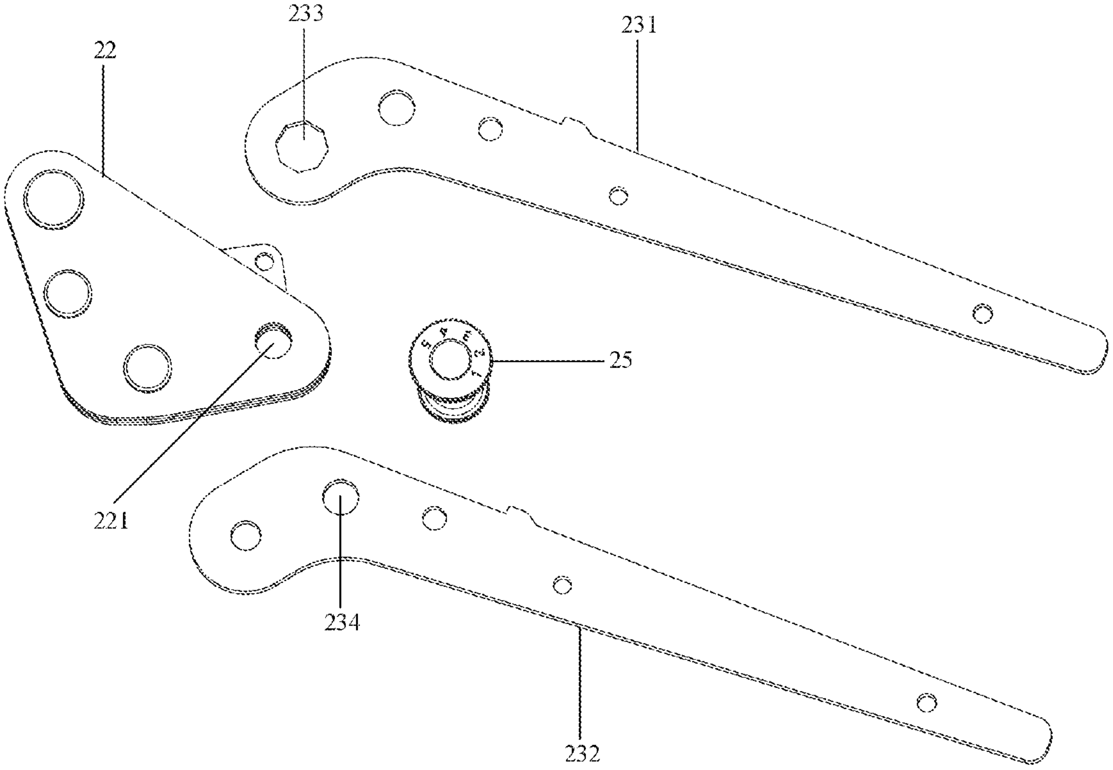
FIG. 4 is a schematic exploded view of the second handle and connecting member of the crimping pliers.

Furthermore, referring to FIG. 4, the second handle 23 comprises a first handle piece 231 and a second handle piece 232 spaced apart from each other; one end of the first handle piece 231 is provided with a first engaging hole 233; the same end of the second handle piece 232 is provided with a second engaging hole 234 facing the first engaging hole 233; one end of the connecting member 22 is inserted into the gap between the first handle piece 231 and the second handle piece 232 and is provided with a through hole 221 directly opposite the first engaging hole 233; an adjustment pin 25 is provided in the first engaging hole 233, the second engaging hole 234 and the through hole 221.

Figure 5:
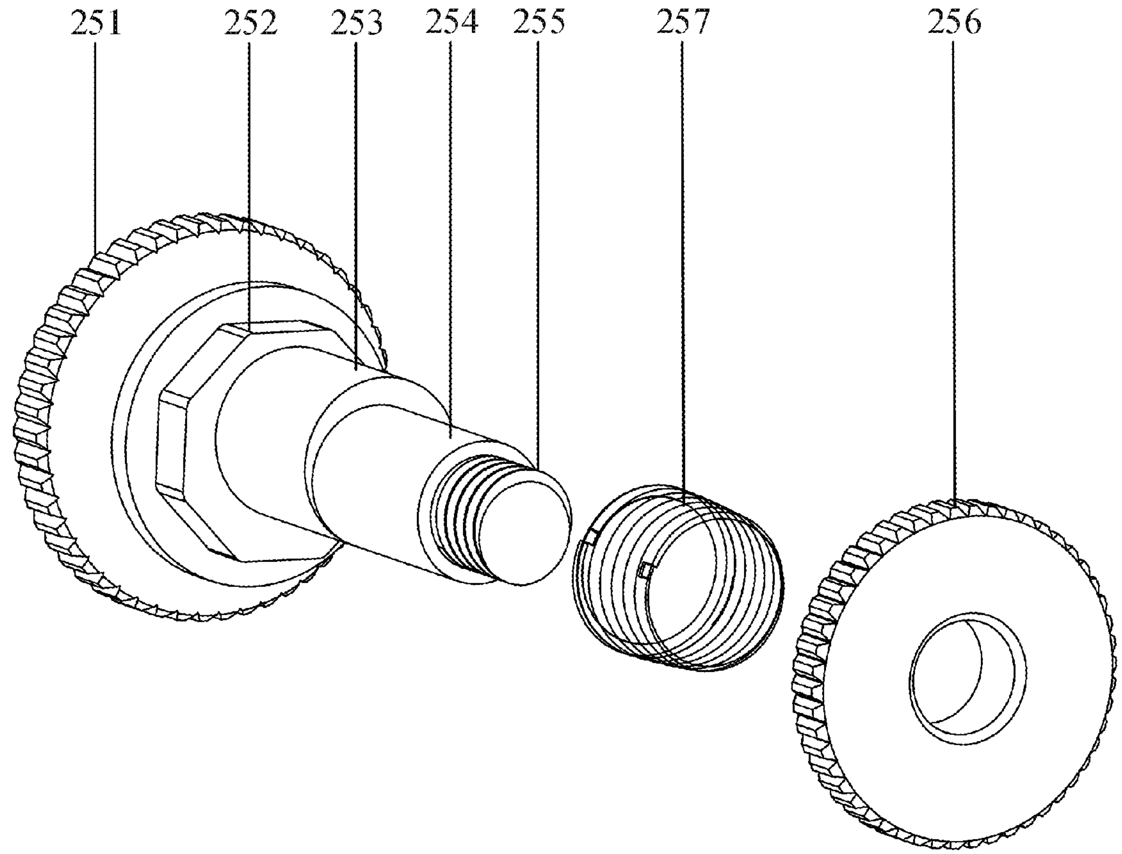
FIG. 5 is a schematic exploded view of the adjustment pin of the crimping pliers.

Furthermore, referring to FIG. 5, the adjustment pin 25 comprises a knob portion 251 arranged in sequence, a first engaging portion 252 matching the first engaging hole 233, an eccentric shaft 253 matching the through hole 221, a second engaging portion 254 matching the second engaging hole 234, a threaded portion 255, and a nut 256 screwed to the threaded portion 255.

It should be noted that when the adjustment pin 25 is installed into the first engaging hole 233, the through hole 221 and the second engaging hole 234, the first engaging portion 252 engages with the first engaging hole 233. The first engaging portion 252 is configured in an angular shape, such as a triangle, a quadrilateral, a polygon, etc. The first engaging hole 233 is configured in a shape matching the first engaging portion 252. Therefore, when the first engaging portion 252 is engaged with the first engaging hole 233, the mutual cooperation between the first engaging portion 252 and the first engaging hole 233 can make the adjustment pin 25 and the second handle 23 relatively fixed. The through hole 221 is engaged with the eccentric shaft 253. It should be noted that the center line of the eccentric shaft 253 does not coincide with the center line of the entire adjustment pin 25. That is, when the adjustment pin 25 rotates to drive the eccentric shaft 253 to rotate, the eccentric shaft 253 can drive the connecting member 22 to move. The movement of the connecting member 22 can drive the first crimping module 4 and the second crimping module 5 to move closer to or away from each other. When equal force is applied to the first handle 12 and the second handle 23, if the first crimping module 4 and the second crimping module 5 are closer, the clamping force generated between the first crimping module 4 and the second crimping module 5 will be greater. If the first crimping module 4 and the second crimping module 5 are further apart, the clamping force generated between the first crimping module 4 and the second crimping module 5 will be smaller.

Specifically, by providing the adjustment pin 25, when it is necessary to adjust the clamping strength between the first crimping module 4 and the second crimping module 5, the user can manually squeeze the nut 256 to cause the adjustment pin 25 to move upward for a certain distance, so that the first engaging portion 252 and the first engaging hole 233 are disengaged, and then the knob portion 251 is rotated to drive the eccentric shaft 253 to rotate, thereby driving the connecting member 22 to rotate. To adjust the distance between the first crimping module 4 and the second crimping module 5, after the adjustment, squeeze the knob part 251 again to make the first engaging portion 252 snap into the first engaging hole 233, and the adjustment is completed.

Preferably, the first engaging portion 252 and the first engaging hole 233 are set in a regular polygon, such as a regular hexagon. When adjusting, each side can correspond to an adjustment gear. For example, the regular hexagonal first engaging portion 252 can set the adjustment gears to six gears, and each time the adjustment pin 25 is rotated 60 degrees, it is one gear.

Furthermore, the second engaging portion 254 is covered with a first elastic member 257, and the first elastic member 257 is located between the nut 256 and the second handle piece 232.

Specifically, by arranging the first elastic member 257, when the nut 256 is squeezed to cause the first engaging portion 252 to disengage from the first engaging hole 233, the first elastic member 257 undergoes elastic deformation and exerts a reverse thrust on the nut 256. When the adjustment pin 25 is rotated to a certain angle so that the first engaging portion 252 can engage in the first engaging hole 233, under the elastic force of the first elastic member 257, the first engaging portion 252 automatically snaps into the first engaging hole 233. There is no need to manually engage the first engaging portion 252 into the first engaging hole 233, making the adjustment process more convenient and faster.

Furthermore, in this embodiment, referring to FIG. 3, a second elastic member 7 is provided between the connecting member 22 near the second handle 23 and the first clamping part 11.

Specifically, the second elastic member 7 is in a normal state when the first handle 12 and the second handle 23 are not gripped tightly. When the first handle 12 and the second handle 23 are held tightly, the pivot point of the connecting member 22 and the second handle 23 moves in a direction away from the first handle 12. The first crimping module 4 and the second crimping module 5 are clamped, the second elastic member 7 is in a stretched state, and the second elastic member 7 generates a pulling force between the connecting member 22 near the second handle 23 and the first clamping part 11. When the first handle 12 and the second handle 23 are released, under the pulling force of the second elastic member 7, the pivot joint between the connecting member 22 and the second handle 23 moves toward the first handle 12, the first crimping module 4 and the second crimping module 5 are opened. By providing the second elastic member 7, when the first handle 12 and the second handle 23 are released, the crimping pliers can automatically return to the open state, making it convenient for the user to perform the next crimping operation.

Figure 6:
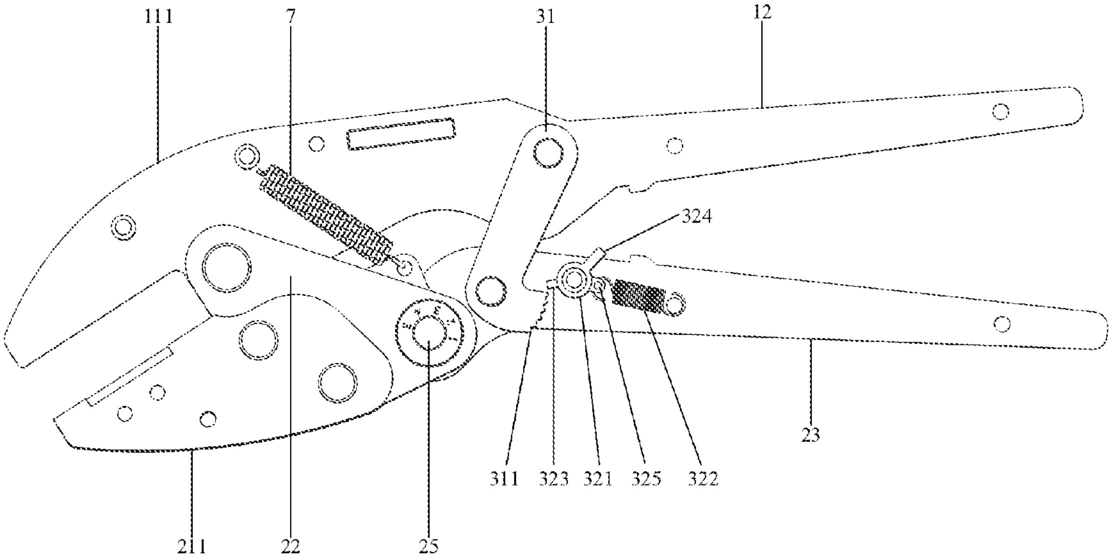
FIG. 6 is another partially disassembled structural schematic diagram of the crimping pliers.

Furthermore, referring to FIG. 6, the limiting component 3 comprises a limiting rod 31 and a limiting part 32, both ends of the limiting rod 31 are pivotally connected to the first handle 12 and the second handle 23 respectively; one end of the limiting rod 31 pivotally connected to the second handle 23 is provided with a tooth groove 311; the limiting part 32 includes an internal hollow shaft body 321 and a third elastic member 322. The shaft body 321 is pivotally assembled on the second handle 23 and close to the tooth groove 311; the outer wall of the shaft body 321 is provided with a cog part 323, a dialing part 324 and a hooking part 325 that match the tooth groove 311; one end of the third elastic member 322 is connected to the second handle 23, and the other end of the third elastic member 322 is connected to the hooking part 325.

Specifically, both ends of the limiting rod 31 are pivotally connected to the first handle 12 and the second handle 23 respectively, so that when the first handle 12 and the second handle 23 are grasped, the limiting rod 31 rotates, thereby driving the tooth groove 311 to rotate. After the tooth groove 311 rotates to a certain angle, it meshes with the cog part 323. At this time, even if the first handle 12 and the second handle 23 are released, the first handle 12 and the second handle 23 will maintain the gripped state due to the cooperation of the tooth groove 311 and the cog part 323. When it is necessary to release the grip state, move the dialing part 324 to disengage the cog part 323 from the tooth groove 311. After losing the support of the cog part 323, the first handle 12 and the second handle 23 move away from each other under the action of the second elastic member 7. The first crimping module 4 and the second crimping module 5 are switched to the open state.

Figure 7:
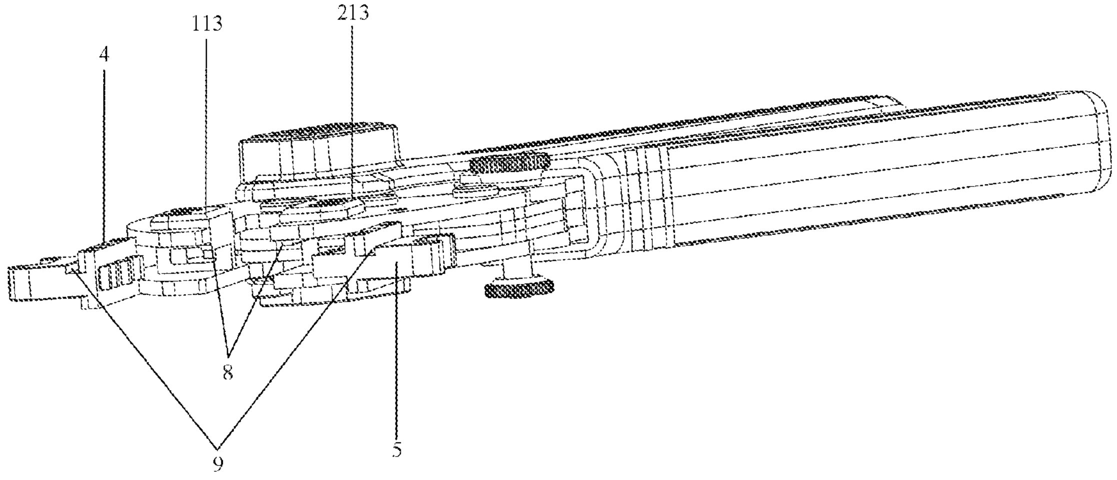
FIG. 7 is another partially disassembled structural schematic diagram of the crimping pliers.

Furthermore, in this embodiment, referring to FIG. 7, a first guide body 113 is provided at the jaw of the first clamping part 11, and a second guide body 213 is provided at the jaw of the second clamping part 21; the first guide body 113 and the second guide body 213 are both provided with limiting slide rails 8, and the first magnetic member 13 and the second magnetic member 24 are provided at the ends of the slide rails 8; the first crimping module 4 and the second crimping module 5 are both provided with slide grooves 9 that match the limiting slide rails 8.

Specifically, by arranging the slide rails 8 at the pliers mouth, arranging the magnetic members at the end of the slide rails 8, and arranging the slide grooves 9 on the crimping module, on the one hand, it enables the crimping module to quickly align itself with the magnetic members during installation and be absorbed by the magnetic members. On the other hand, the crimping module can only move along the direction of the slide rail 8, and with the magnetic component provided at the end of the slide rail 8, the function of fixing the crimping module is further improved.

Figure 8:
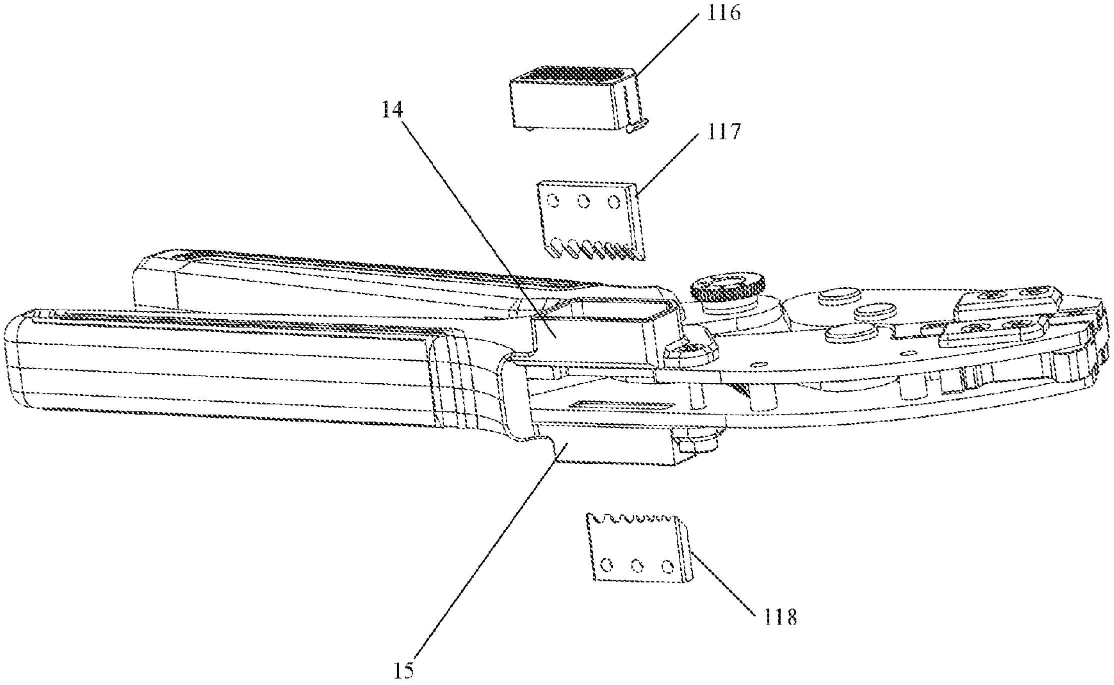
FIG. 8 is another partially disassembled structural schematic diagram of the crimping pliers.

Furthermore, in order to improve the practicality of the crimping pliers, in some embodiments, referring to FIG. 3 and FIG. 8, the connection between the first handle 12 and the first clamping part 11 is provided with a installation housing 14 and a fixed installation groove 15, one of the two first clamping piece 111 is provided with a bayonet 114 and the bayonet 114 is located at the bottom of the installation housing 14, and the other first clamping piece 111 is provided with a card slot 115 and the card slot 115 is located at the top of the installation housing 14; an elastic button 116 is movably provided in the installation housing 14. The elastic button 116 includes a pressing part and a spring. The pressing part is arranged on the top end of the spring. The bottom end of the spring is in contact with the first clamping piece 111 provided with the bayonet 114. A first peeling knife 117 is provided at the lower end of the elastic button 116 and the first peeling knife 117 is inserted into the bayonet 114. A second peeling knife 118 is disposed in the fixed installation groove 15 and is inserted into the card slot 115, and the cutting edges of the first peeling knife 117 and the second peeling knife 118 are in contact with each other.

Specifically, when the wire needs to be stripped, the end of the wire that needs to be stripped is stuck into the cutting edges of the first peeling knife 117 and the second peeling knife 118, then press the elastic button 116 downward again, and the first peeling knife 117 moves downward to peel the end of the wire. After the peeling is completed, the elastic button 116 is released, and the elastic button 116 is reset, driving the first peeling knife 117 to return to its original position, and then the stripped end of the wire is taken out.

Figure 9:
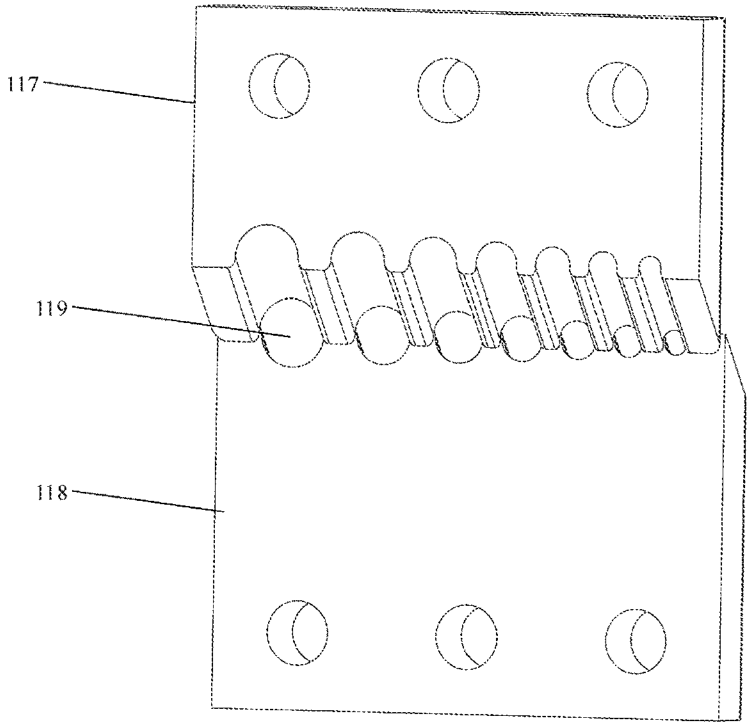
FIG. 9 is a schematic structural diagram of the first peeling knife and the second peeling knife of the crimping pliers.

Furthermore, in order to meet the different needs of users, please refer to FIG. 9. The first peeling knife 117 and the second peeling knife 118 are respectively provided with a plurality of tangent grooves 119 with different diameters along the length direction.

Specifically, by providing a plurality of tangent grooves 119 with different diameters, wires with different wire specifications can be stripped, thereby improving the practicality of the wire stripping structure.

Figure 10:
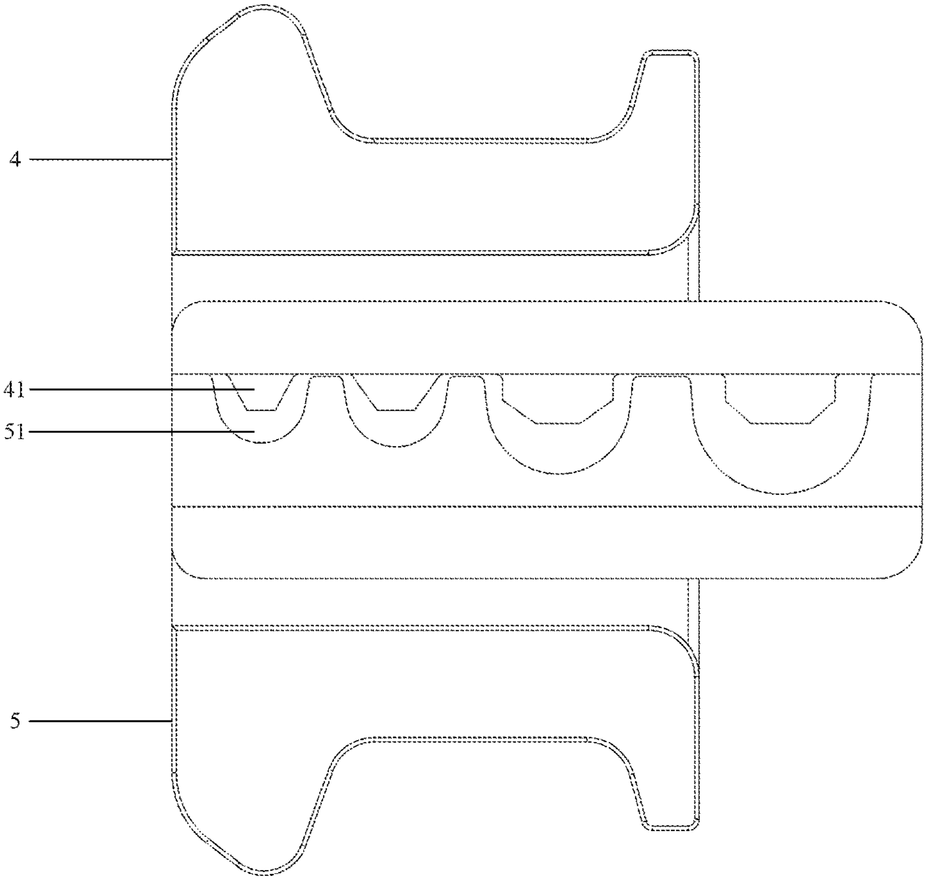
FIG. 10 is a schematic structural diagram of the crimping module of the crimping pliers.

Furthermore, in order to adapt to the different needs of users, please refer to FIG. 10, one side of the second crimping module 5 facing the first crimping module 4 is recessed to form clamping grooves 51 of different diameters; one side of the first crimping module 4 facing the second crimping module 5 is equipped with protrusions 41 of different sizes, and the protrusions 41 are one-to-one corresponding to the clamping grooves 51.

Specifically, the diameter specifications of wires corresponding to different clamping grooves 51 are different, so that the first crimping module 4 and the second crimping module 5 can be applied to wires of various specifications. Combined with the replaceable characteristics of the first crimping module 4 and the second crimping module 5, it can adapt to more wire specifications.

Above are only preferred embodiments of the present disclosure and are not intended to limit the present disclosure. Any modification, equivalent replacement and improvement made within spirit and principle of the present disclosure should be included in protective scope of the present disclosure.

What is claimed is:

1. Crimping pliers, comprising: a first plier member, a second plier member, a limiting component, a first crimping module, a second crimping module;

the first plier member comprises a first clamping part and a first handle connected with the first clamping part; the first clamping part comprises two first clamping pieces spaced apart to form a first clamping gap; a first magnetic component is disposed in the first clamping gap at the jaw of the first clamping part;

the second plier member comprises a second clamping part, a connecting member and a second handle; one side of the connecting member is fixedly arranged on the second clamping part; one end of the connecting member is pivotally connected in the first clamping gap on one side of the first clamping part, and the other end is pivotally connected to one end of the second handle; the second clamping part comprises two second clamping pieces spaced apart to form a second clamping gap; a second magnetic component is disposed in the second clamping gap at the jaw of the second clamping part;

the limiting component is provided between the first handle and the second handle;

the first crimping module is detachably disposed in the first clamping gap at the jaw of the first clamping part and is adsorbed by the first magnetic member;

the second crimping module is detachably disposed in the second clamping gap at the jaw of the second clamping part and is adsorbed by the second magnetic member;

wherein the second handle comprises a first handle piece and a second handle piece spaced apart from each other; one end of the first handle piece is provided with a first engaging hole; the same end of the second handle piece is provided with a second engaging hole facing the first engaging hole; one end of the connecting member is inserted into the gap between the first handle piece and the second handle piece and is provided with a through hole directly opposite the first engaging hole; an adjustment pin is provided in the first engaging hole, the second engaging hole and the through hole;

the adjustment pin comprises a knob portion arranged in sequence, a first engaging portion matching the first engaging hole, an eccentric shaft matching the through hole, a second engaging portion matching the second engaging hole, a threaded portion, and a nut screwed to the threaded portion.

2. The crimping pliers of claim 1, wherein the second engaging portion is covered with a first elastic member, and the first elastic member is located between the nut and the second handle piece.

3. The crimping pliers of claim 2, wherein a second elastic member is provided between the connecting member near the second handle and the first clamping part.

4. The crimping pliers of claim 3, wherein the limiting component comprises a limiting rod and a limiting part, both ends of the limiting rod are pivotally connected to the first handle and the second handle respectively; one end of the limiting rod pivotally connected to the second handle is provided with a tooth groove; the limiting part includes an internal hollow shaft body and a third elastic member, the shaft body is pivotally assembled on the second handle and close to the tooth groove; the outer wall of the shaft body is provided with a cog part, a dialing part and a hooking part that match the tooth groove; one end of the third elastic member is connected to the second handle, and the other end of the third elastic member is connected to the hooking part.

5. The crimping pliers of claim 1, wherein a first guide body is provided at the jaw of the first clamping part, and a second guide body is provided at the jaw of the second clamping part; the first guide body and the second guide body are both provided with limiting slide rails, and the first magnetic member and the second magnetic member are provided at the ends of the slide rails; the first crimping module and the second crimping module are both provided with slide grooves that match the limiting slide rails.

6. The crimping pliers of claim 1, wherein a connection between the first handle and the first clamping part is provided with a installation housing and a fixed installation groove, one of the two first clamping piece is provided with a bayonet and the bayonet is located at a bottom of the installation housing, and the other first clamping piece is provided with a card slot and the card slot is located at a top of the installation housing; an elastic button is movably provided in the installation housing; a first peeling knife is provided at the lower end of the elastic button and the first peeling knife is inserted into the bayonet; a second peeling knife is disposed in the fixed installation groove and is inserted into the card slot, and the cutting edges of the first peeling knife and the second peeling knife are in contact with each other.

7. The crimping pliers of claim 6, wherein the first peeling knife and second peeling knife are correspondingly provided with tangent grooves of different diameters along the length direction.

8. The crimping pliers of claim 1, wherein one side of the second crimping module facing the first crimping module is recessed to define clamping grooves of different diameters; protrusions of different sizes are disposed on one side of the first crimping module facing the second crimping module; the protrusions are one-to-one corresponding to the clamping grooves.

* * * * *